United States Patent [19]

Fritz

[11] Patent Number: 4,600,177
[45] Date of Patent: Jul. 15, 1986

[54] METHOD OF HOISTING AN AUTOMOBILE HARD TOP

[75] Inventor: Albert E. Fritz, Los Gatos, Calif.

[73] Assignee: Precision Auto Designs, Inc., Campbell, Calif.

[21] Appl. No.: 780,993

[22] Filed: Sep. 27, 1985

Related U.S. Application Data

[63] Continuation of Ser. No. 599,639, Apr. 12, 1984, abandoned.

[51] Int. Cl.⁴ .......................... B66F 7/26; B66D 1/36
[52] U.S. Cl. .................................... 254/338; 254/47; 294/74
[58] Field of Search ............... 254/336, 334, 338, 226, 254/47; 294/74, 78.2, 82.12

[56] References Cited

U.S. PATENT DOCUMENTS

| | | | |
|---|---|---|---|
| 609,417 | 8/1898 | Day | 294/74 |
| 1,021,585 | 3/1912 | Evert | 254/47 |
| 1,072,787 | 9/1913 | Stowe | 254/334 |
| 1,298,508 | 3/1919 | Eberhardt | 254/338 |
| 1,450,950 | 4/1923 | Jenkins | 254/338 |
| 3,120,403 | 2/1964 | Molzan et al. | 294/74 |

Primary Examiner—Billy S. Taylor
Attorney, Agent, or Firm—Gerald L. Moore

[57] ABSTRACT

A hoist for lifting a hard top (10) from an automobile and storing it at the garage ceiling comprising a winch (25) for winding a cable (38) that passes through pulleys (39,41) fixed to the ceiling. The cable is fixed to a web strap (50) having end hooks (51) for attachment to the side edges of the top. A cable (52) having hooks (54) maintain the top properly balanced for lifting it rear edge first from the automobile.

1 Claim, 1 Drawing Figure

METHOD OF HOISTING AN AUTOMOBILE HARD TOP

This is a continuation, of application Ser. No. 6/599,639, filed Apr. 12, 1984, now abandoned.

FIELD OF THE INVENTION

This invention relates to a hoist for removing and storing automobile tops.

BACKGROUND OF THE INVENTION

Many convertible automobiles are now furnished with both a hard top and a soft top. Usually the hard top is used in the winter and the soft top in the summer. Such usage requires that the hard top be stored for part of the year. Additionally, the removal of such tops requires two people since they are quite cumbersome and heavy.

It is the purpose of the present invention to provide an apparatus for removal and storage of such automobile tops.

SUMMARY OF THE INVENTION

A hoist for removing and storing automobile tops comprising a winch adapted for fastening to the garage side wall adjacent the automobile, a first pulley with means for attachment to the garage side wall above the winch and a second pulley, a rail with means for attachment to the garage ceiling above the normal position of the automobile top when the automobile is parked in the garage, means for attachment of the second pulley to the rail, and a cable fixed to the winch and threaded through the first and second pulleys with attachment means fixed to the end.

A sling comprising a first strap with hooks attached to each end fixed near the center point to the hook, a second rope like member having hooks attached to each end and fixed near the center point thereof to the hook such that the web hooks can be attached to the side of the automobile top and the cable hooks can be attached to the front and back and with operation of the winch the cable will pull the top upward from the automobile, and locking means for locking the winch in position with the top raised for storage of the top in suspension from the garage ceiling.

DESCRIPTION OF THE INVENTION

Figure 1:
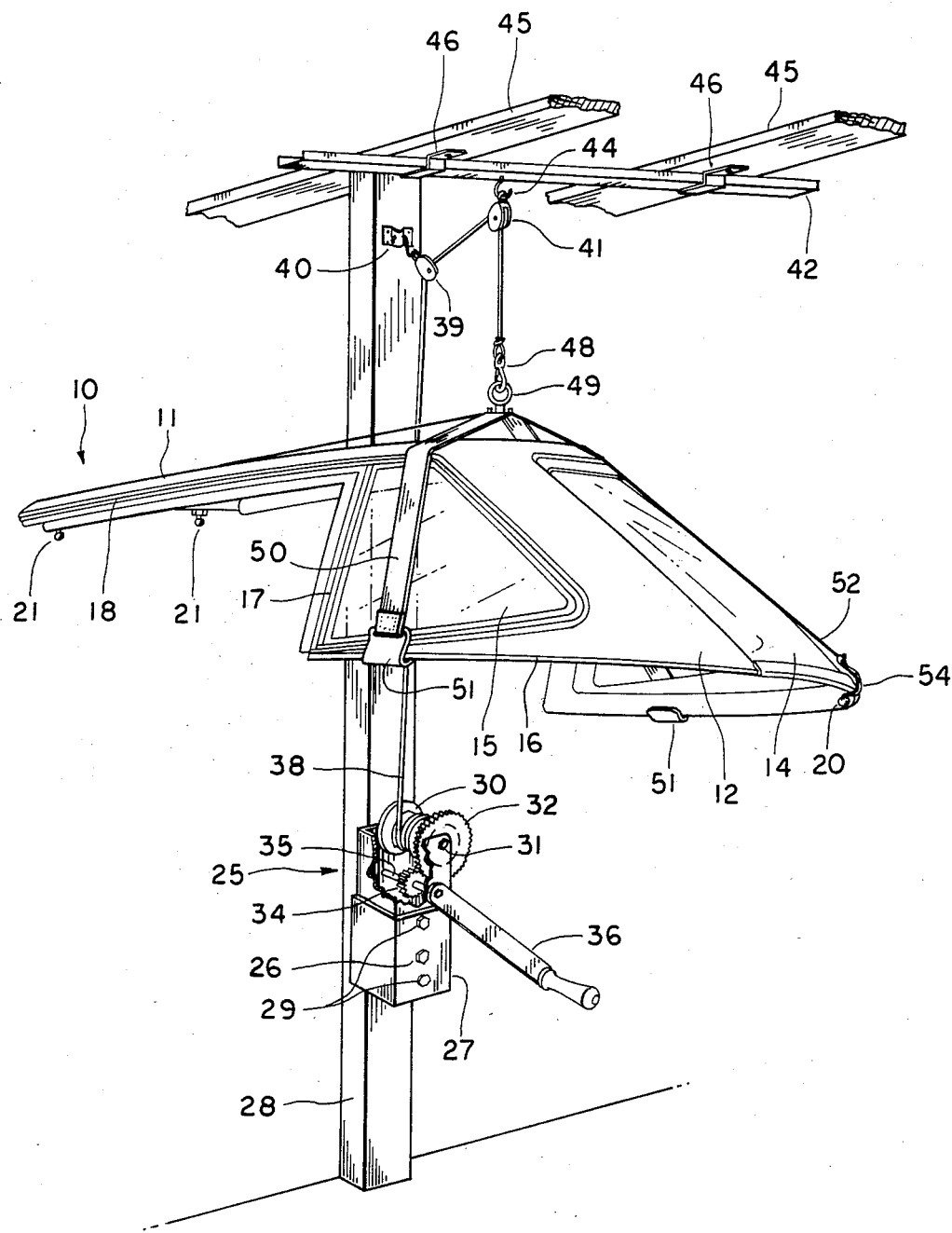
FIG. 1 shows the winch fixed to an automobile top which is raised to the storage position near the garage ceiling.

The present invention is for use with an automobile hard top 10 that is removable from the automobile. Such a top is shown in FIG. 1 and usually comprises a top member 11 extending forward from a rear window portion 12. The hard top, in this instance, includes a rear window 14 and a pair of side windows 15. A chrome trim 16 extends around the lower edge and forward to an upright chrome window guide 17. A window seal trim 18 extends along the side edges of the top. The top is fixed to the automobile by a pair of rear pins 20 and a pair of forward pins 21 in a manner that the rear pins must be removed first followed by removal of the forward pins for removal of the top from the automobile. The opposite procedure is necessary for replacing the top on the automobile.

The subject invention comprises a hoist which allows an owner to remove and store the automobile top without assistance. The hoist comprises a winch 25 which is fixed by means of bolts 26 to a first channel 27 serving as a means for attaching the winch to the side wall stud 28 of the garage. The channel is fixed to the wall stud by lag bolts 29.

The winch comprises a drum 30 rotatably fixed to an axle 31 and including teeth 32 on the outer edge of one side. Intermeshing with these gear teeth is a second gear 34 fixed directly to a shaft 35 to which is fixed the handle 36. Thus, by turning the handle the drum is turned to take up or let out a cable 38.

The cable 38 extends to a first pulley 39 fixed to the stud 28 by a pulley support 40. A second pulley 41 is mounted on a second channel 42 by a hanger 44. This second channel is fixed to the ceiling joist 45 by brackets 46. Fixed to the cable end is a hook 48. The hook is attached to a ring support 49 which clamps onto the center of a web strap 50 having hooks 51 fixed to the end. A second flexible member comprising a cable 52 is also attached near the center to the ring 49 and includes hooks 54 attached to the end thereof.

The hooks 51 are attached beneath the side edge of the top to carry the weight of the hard top while the hooks 54 are attached at the fore and rear portions of the top for balancing and distributing the lifting forces so the top will remain substantially at the attitude shown. The cable 52 assures that the top be balanced with the forward edge slightly down so the rear pins will always be removed from the automobile first. Thus, by turning the crank 36 the top is lifted with the rear portion first to remove the stud 20 from the automobile followed by removal of the studs 21. Further turning of the crank raises the top to the position shown near the ceiling for storage. Locking means 55 on the winch automatically engages when the crank is stationary to hold the top in the lifted position.

When it is desired to return the hard top to the automobile, the top is lowered so the studs 21 contact the automobile first, or in the reverse order as when removed.

The invention claimed:

1. The method of removing and replacing an automobile hard top on an automobile wherein the hard top comprises a horizontal top surface, a rear window portion and two side panel portions, said method comprising:
   supplying a sling having a strap with hooks on each end and a second cable having a hook on each end;
   hooking the strap hooks to the opposite side panels of the hard top so the hard top will lift up in the horizontal position from the automobile;
   hooking the second cable to the rear window portion and the horizontal top surface;
   supplying a lifting means to hoist the strap and second cable vertically to lift the hard top from the automobile; and
   making the length of the second cable attached to the rear window portion so it is sufficiently short to lift the rear window portion first and tilt the hard top forward from the horizontal to properly separate the hard top from the automobile.

* * * * *